(12) United States Patent
Scovil et al.

(10) Patent No.: US 12,253,664 B2
(45) Date of Patent: Mar. 18, 2025

(54) SCOPE MOUNT

(71) Applicant: Magview, LLC, Sparta, WI (US)

(72) Inventors: John R. Scovil, Onalaska, WI (US); Mark J. Hayes, Onalaska, WI (US); Mathew A. McPherson, Norwalk, WI (US)

(73) Assignee: Magview, LLC, Lake Oswego, OR (US)

( * ) Notice: Subject to any disclaimer, the term of this patent is extended or adjusted under 35 U.S.C. 154(b) by 525 days.

(21) Appl. No.: 17/698,923

(22) Filed: Mar. 18, 2022

(65) Prior Publication Data

US 2022/0299748 A1    Sep. 22, 2022

Related U.S. Application Data

(60) Provisional application No. 63/163,615, filed on Mar. 19, 2021.

(51) Int. Cl.
*G02B 23/16* (2006.01)
*G03B 17/56* (2021.01)

(52) U.S. Cl.
CPC .......... *G02B 23/16* (2013.01); *G03B 17/566* (2013.01)

(58) Field of Classification Search
None
See application file for complete search history.

(56) References Cited

U.S. PATENT DOCUMENTS

| | | |
|---|---|---|
| 2,488,188 A | 11/1949 | Halvorson |
| 2,738,585 A | 3/1956 | Vissing |
| 3,873,823 A | 3/1975 | Northrup et al. |
| 4,239,327 A | 12/1980 | Grant |
| 4,777,730 A | 10/1988 | Huggins |
| 4,899,450 A | 2/1990 | Huggins |
| 5,053,794 A | 10/1991 | Benz |
| 5,406,418 A | 4/1995 | Deary |
| 6,416,189 B1 | 7/2002 | Watson |
| 7,178,997 B2 | 2/2007 | Claudi et al. |
| 7,246,956 B2 | 7/2007 | Pernstich et al. |
| 7,721,480 B2 | 5/2010 | Campean |
| 7,924,515 B2 | 4/2011 | Plangger |
| 8,073,324 B2 | 12/2011 | Tsai |
| 8,210,757 B2 | 7/2012 | Sterns et al. |
| 8,639,106 B1 | 1/2014 | Gleason et al. |
| 9,191,562 B1 | 11/2015 | Schorr, II |
| 9,624,958 B2 | 4/2017 | Hyers |
| 9,632,305 B2 | 4/2017 | Peters et al. |
| 10,234,749 B2 | 3/2019 | Hyers |
| 10,678,120 B1 | 6/2020 | Lozano-Buhl et al. |
| 10,969,663 B2 | 4/2021 | Linn |
| 11,199,698 B2 | 12/2021 | Meade |
| 2005/0213959 A1 | 9/2005 | Chiang |

(Continued)

*Primary Examiner* — Derek S. Chapel
(74) *Attorney, Agent, or Firm* — Hovey Williams LLP

(57) ABSTRACT

In some embodiments, an apparatus comprises a body arranged to engage an optical scope. The body comprises a first portion and a second portion moveable with respect to the first portion between a first position and a second position. The first portion comprises a sidewall defining an aperture having a central axis and the second portion comprises a magnet. In the first position, the second portion is arranged to cover the aperture and a radial distance from the central axis to the sidewall is greater than a radial distance from the central axis to the magnet.

19 Claims, 18 Drawing Sheets

(56) References Cited

U.S. PATENT DOCUMENTS

| | | |
|---|---|---|
| 2011/0249335 A1* | 10/2011 | Strawderman ..... G02B 27/0006 |
| | | 359/511 |
| 2012/0236424 A1 | 9/2012 | Yang |
| 2013/0016963 A1 | 1/2013 | Miller |
| 2014/0022646 A1 | 1/2014 | Kurz |
| 2014/0253800 A1 | 9/2014 | McLeod |
| 2014/0375186 A1 | 12/2014 | Tarnow et al. |
| 2015/0042873 A1 | 2/2015 | Hunt |
| 2015/0226960 A1 | 8/2015 | Cheng et al. |
| 2017/0254620 A1* | 9/2017 | Dasukevich ............ F41G 1/473 |
| 2017/0285334 A1* | 10/2017 | Meade ..................... G02B 7/02 |
| 2017/0299334 A1* | 10/2017 | Hamilton .................. F41G 3/08 |
| 2018/0245879 A1* | 8/2018 | Mueller .................. F41G 1/383 |
| 2018/0259118 A1 | 9/2018 | Shen |
| 2019/0235355 A1* | 8/2019 | Linn ...................... G02B 23/16 |
| 2019/0302443 A1 | 10/2019 | Garrison et al. |
| 2020/0019042 A1* | 1/2020 | Crispin ................ G03B 17/565 |
| 2020/0237310 A1* | 7/2020 | Lozano-Buhl ....... A61B 5/0077 |
| 2021/0200069 A1 | 7/2021 | Enoch |
| 2022/0397811 A1* | 12/2022 | Goodworth ............ G03B 30/00 |

* cited by examiner

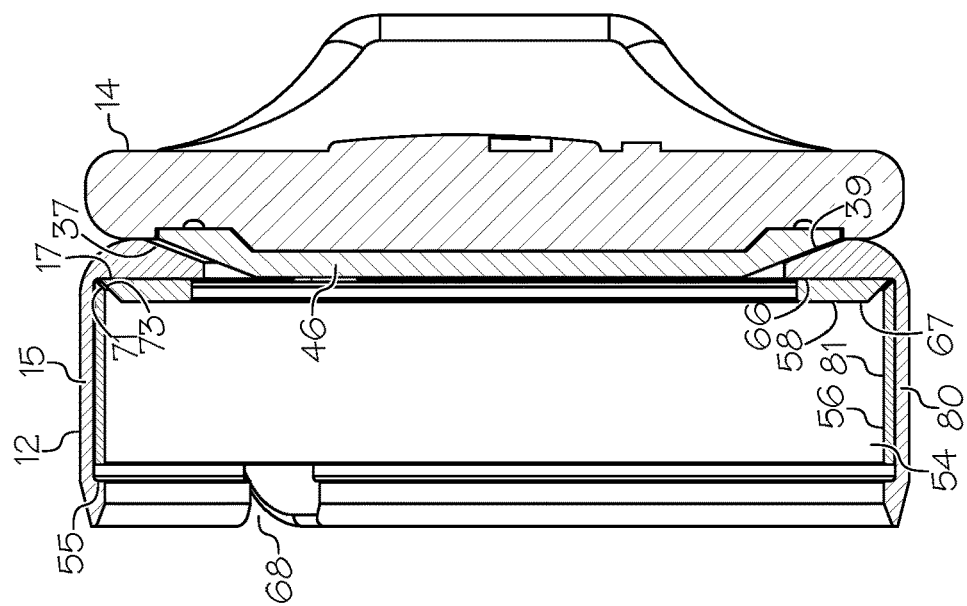
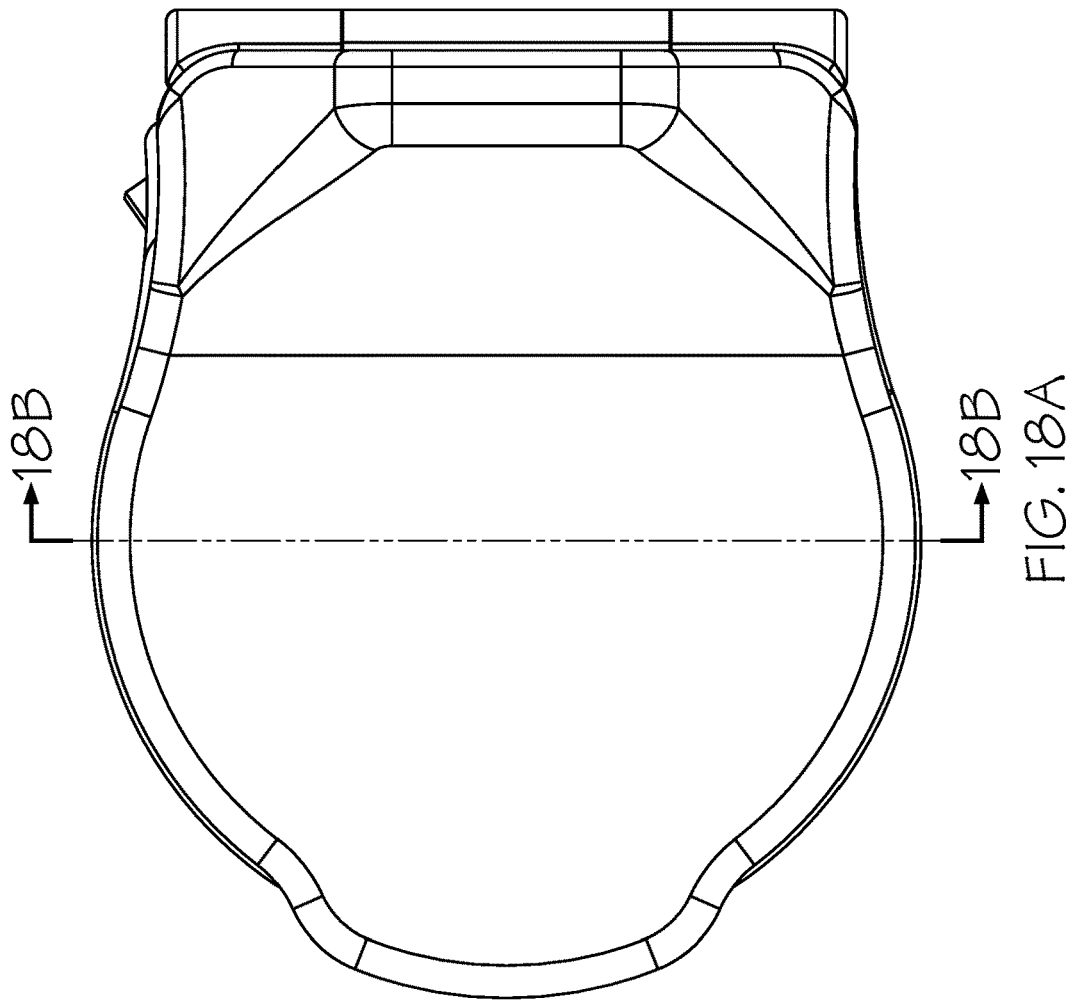

SCOPE MOUNT

CROSS-REFERENCE TO RELATED APPLICATIONS

This application claims the benefit of U.S. Patent Application No. 63/163,615, filed Mar. 19, 2021, the entire content of which is hereby incorporated herein by reference.

BACKGROUND OF THE INVENTION

This invention relates generally to optical scopes and more specifically to mounts that allow an accessory, such as a recording device, to be used with an optical scope.

Optical scopes such as spotting scopes, binoculars and the like are generally known in the art and used to view objects at a distance. Users often have a desire to capture images and/or video of distant objects. During a hunting activity, users desire to capture recordings of a target before, during and after a shot. Certain users may have a desire to carry a minimal amount of equipment. In some cases, it is not practical to carry a large expensive camera or a dedicated zoom lens, but the user may have other recording devices available, such as a smartphone or action camera.

There remains a need for mount and adapter systems that allow commonly carried cameras to be used with optical scopes. There remains a need for image and video capture systems that are compatible with optical scopes.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In some embodiments, an apparatus comprises a body arranged to engage an optical scope. The body comprises a first portion and a second portion moveable with respect to the first portion between a first position and a second position. The first portion comprises a sidewall defining an aperture having a central axis and the second portion comprises a magnet. In the first position, the second portion is arranged to cover the aperture and a radial distance from the central axis to the sidewall is greater than a radial distance from the central axis to the magnet. In some embodiments, in the second position, the second portion does not cover the aperture.

In some embodiments, the body comprises a hinge between the first portion and the second portion.

In some embodiments, the body comprises a first position magnet arranged to bias the body to the first position.

In some embodiments, the body comprises a second position magnet arranged to bias the body to the second position.

In some embodiments, the first portion comprises an alignment surface and the second portion comprises a contacting surface that are aligned on a reference plane in the second position. In some embodiments, the alignment surface comprises a hinge knuckle.

In some embodiments, the first portion comprises a clamp arranged to reduce a diameter of the sidewall.

In some embodiments, the first portion comprises a focus adapter positioned between the front wall and the optical scope.

In some embodiments, the first portion comprises a sizing adapter positioned between the sidewall and the optical scope.

In some embodiments, the sizing adapter and the focus adapter comprise complimentary beveled surfaces arranged to contact one another.

In some embodiments, the mount is used with an accessory comprising a target and a lens, the magnet arranged to engage the target and retain the lens in alignment with the aperture.

In some embodiments, an apparatus comprises a body arranged to engage an optical scope. The body comprises an aperture and a plurality of magnets spaced around the aperture.

In some embodiments, the apparatus is used combination with an accessory comprising a target and a lens, the plurality of magnets arranged to engage the target and retain the lens in alignment with the aperture.

In some embodiments, the apparatus is used in combination with an accessory and a binocular, the accessory comprising a target and a lens, the binocular comprising a first scope and a second scope, the body engaged with the first scope, the target aligned with the first scope, the lens aligned with the second scope.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

FIG. 18 shows a cross-sectional view of the embodiment of a mount shown in FIG. 17.

DETAILED DESCRIPTION OF THE INVENTION

Figure 1:
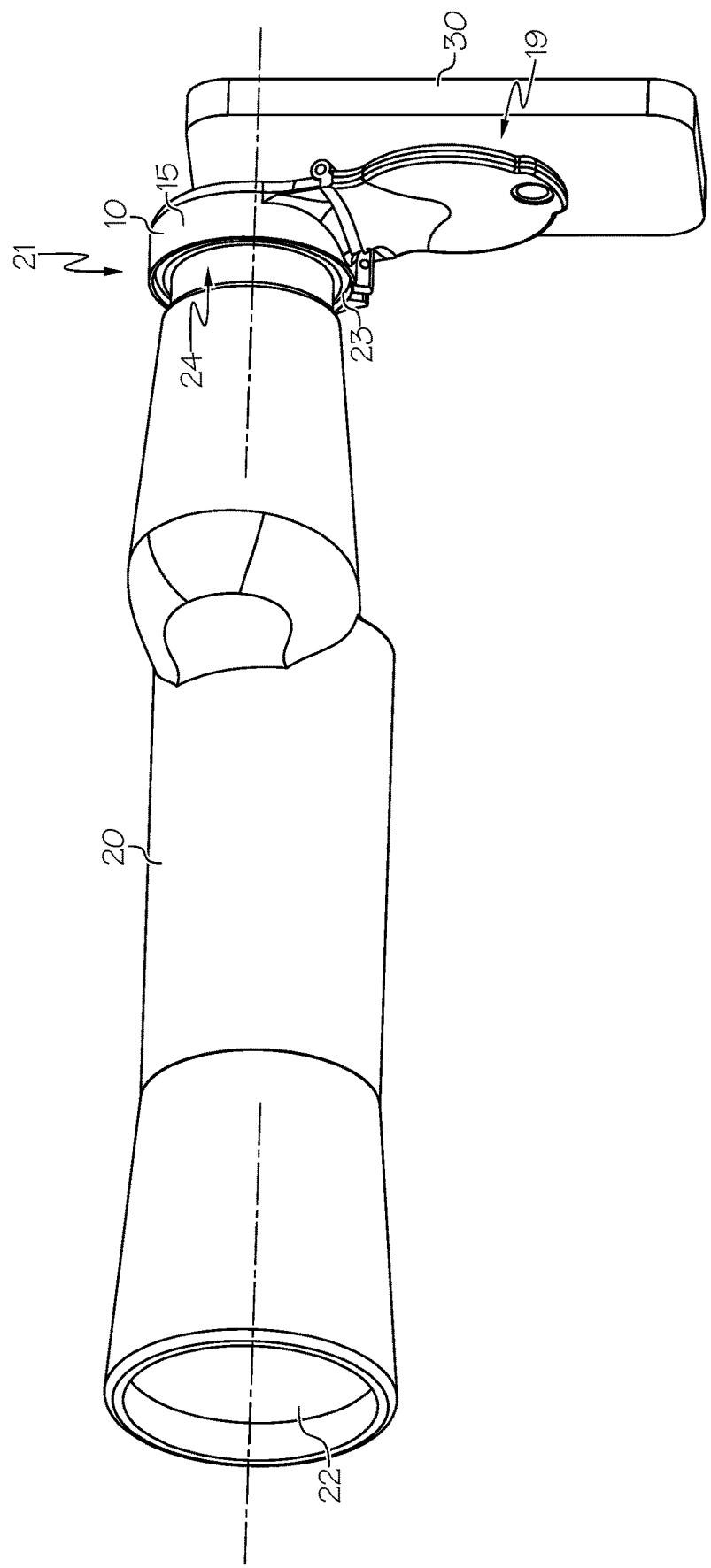
FIG. 1 shows an embodiment of a mount orienting an accessory with respect to an optical scope.

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

FIG. 1 shows an embodiment of a mount 10 being used in conjunction with an embodiment of an optical scope 20 and an embodiment of an accessory 30. In some embodiments, an optical scope 20 comprises a monocular or a spotting scope. In some embodiments, an optical scope 20 comprises an objective lens 22 and an ocular lens 24. A user will typically position their eye near the ocular lens 24 and look through the optical scope 20 to view a distant object.

In some embodiments, an optical scope 20 comprises an end portion 21 and an ocular lens 24 is located at or near the end portion 21.

In some embodiments, a mount 10 is arranged to engage the optical scope 20. In some embodiments, the mount 10 is arranged to engage the end portion 21 of the optical scope 20. In some embodiments, the mount 10 is arranged to engage an eye cup 23 positioned at the end portion 21.

In some embodiments, the mount 10 is arranged to engage the accessory 30 and position the accessory 30 with respect to the optical scope 20. In some embodiments, the accessory 30 comprises an image capturing device comprising a lens, and the mount 10 positions the lens of the accessory 30 in alignment with the ocular lens 24 of the optical scope 20.

Figure 2:
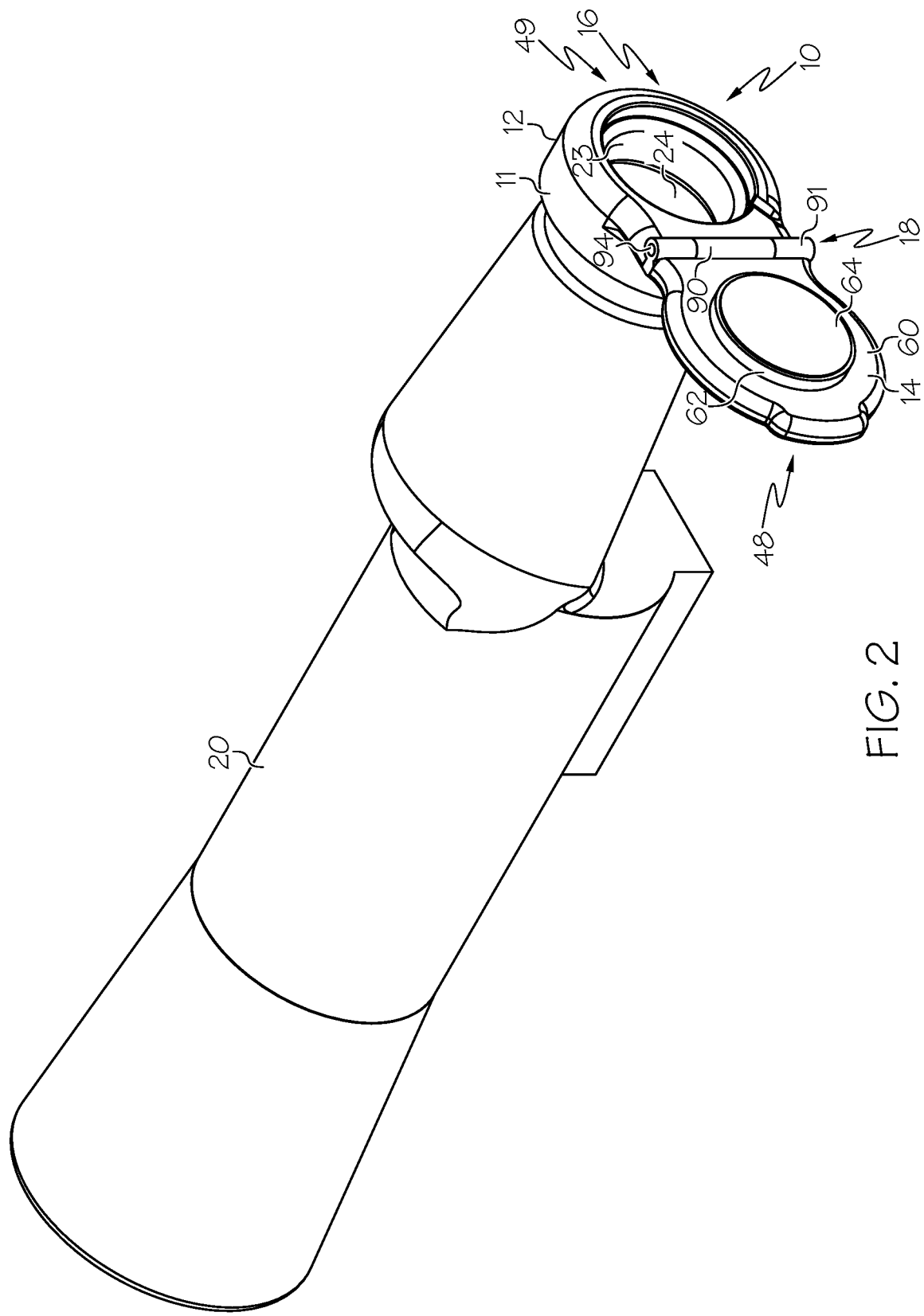
FIG. 2 shows an embodiment of a mount engaged with an embodiment of an optical scope.
Figure 3:
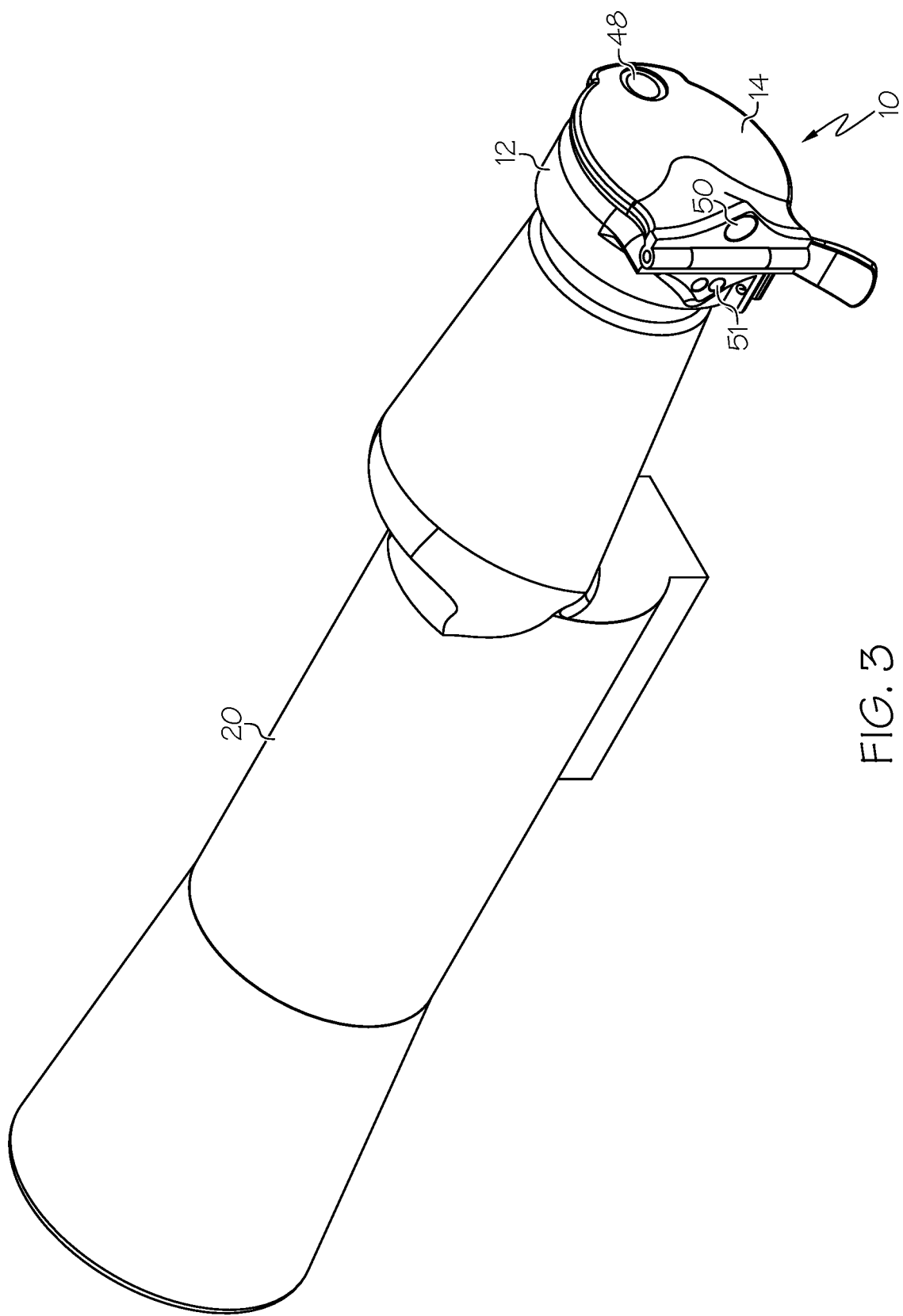
FIG. 3 shows the mount of FIG. 2 in another orientation.

FIG. 2 shows an embodiment of a mount 10 engaged with an optical scope 20, with the mount 10 in an open configuration. FIG. 3 shows an embodiment of a mount 10 engaged with an optical scope 20 in a closed configuration. In some embodiments, the mount 10 comprises a lens cover.

In some embodiments, a mount 10 comprises a body 11 comprising a first portion 12 and a second portion 14. In some embodiments, the first portion 12 is moveable with respect to the second portion 14. In some embodiments, the mount 10 comprises a hinge 18 and the first portion 12 is moveable with respect to the second portion 14 about an axis of the hinge 18. In some embodiments, the hinge 18 comprises a first knuckle 90 and a second knuckle 91 engaged with a pin 94. In some embodiments, the first portion 12 comprises the first knuckle 90 and the second portion 14 comprises the second knuckle 91.

In some embodiments, the first portion 12 comprises an aperture 16. In some embodiments, the first portion 12 is arranged to engage an eye cup 23 of the optical scope 20. In some embodiments, the ocular lens 24 of the optical scope 20 is visible through the aperture 16.

In some embodiments, the mount 10 comprises a first orientation wherein the second portion 14 is in a first position with respect to the first portion 12. In some embodiments, the first orientation comprises a closed orientation and the second portion 14 is arranged to cover the aperture 16, for example as shown in FIG. 3. In some embodiments, the mount 10 comprises a second orientation wherein the second portion 14 is in a second position with respect to the first portion 12. In some embodiments, the second orientation comprises an open orientation and the second portion 14 does not cover the aperture 16, for example as shown in FIG. 2. In some embodiments, in the second orientation, the central axis of the aperture 16 does not intersect the second portion 14.

In some embodiments, the second portion 14 rotates approximately 180 degrees between the first orientation and the second orientation.

In some embodiments, the mount 10 comprises a retaining system arranged to retain the mount 10 in the first orientation. In some embodiments, a first retaining system is arranged to retain the mount 10 in the first orientation. In some embodiments, the first retaining system comprises a magnet 48 and a magnetically attractive target 49. In some embodiments, the magnet 48 is attached to the second portion 14 and the target 49 is attached to the first portion 12, or vice versa. In some embodiments, the target 49 comprises a ferrous material. In some embodiments, the target 49 comprises a magnet. In some embodiments, the magnet 48 and target 49 are hidden in cavities formed in the respective first portion 12 and second portion 14. In some embodiments, the magnet 48 and target 49 of the first retaining system are spaced apart from one another when the mount 10 is in the second orientation (see FIG. 2) and are close to one another (e.g. magnetically engaged) when the mount 10 is in the first orientation (see FIG. 3).

In some embodiments, in the first orientation, a distance from the central axis of the aperture 16 to the sidewall of the first portion 12 is greater than a distance from the central axis to the magnet 44.

In some embodiments, the mount 10 comprises a retaining system arranged to retain the mount 10 in the second orientation. In some embodiments, a second retaining system is arranged to retain the mount 10 in the second orientation. In some embodiments, the second retaining system comprises a magnet 50 and a magnetically attractive target 51. In some embodiments, the magnet 50 is attached to the second portion 14 and the target 51 is attached to the first portion 12, or vice versa. In some embodiments, the target 51 comprises a ferrous material. In some embodiments, the target 51 comprises a magnet. In some embodiments, the magnet 50 and target 51 are hidden in cavities formed in the respective first portion 12 and second portion 14. In some embodiments, the magnet 50 and target 51 of the second retaining system are spaced apart from one another when the mount 10 is in the first orientation (see FIG. 3) and are close to one another (e.g. magnetically engaged) when the mount 10 is in the second orientation (see FIG. 2).

In some embodiments, the first portion 12 comprises a material that is not magnetically attractive, such as a non-ferrous material. In some embodiments, the second portion 14 comprises a material that is not magnetically attractive, such as a non-ferrous material.

Figure 4:
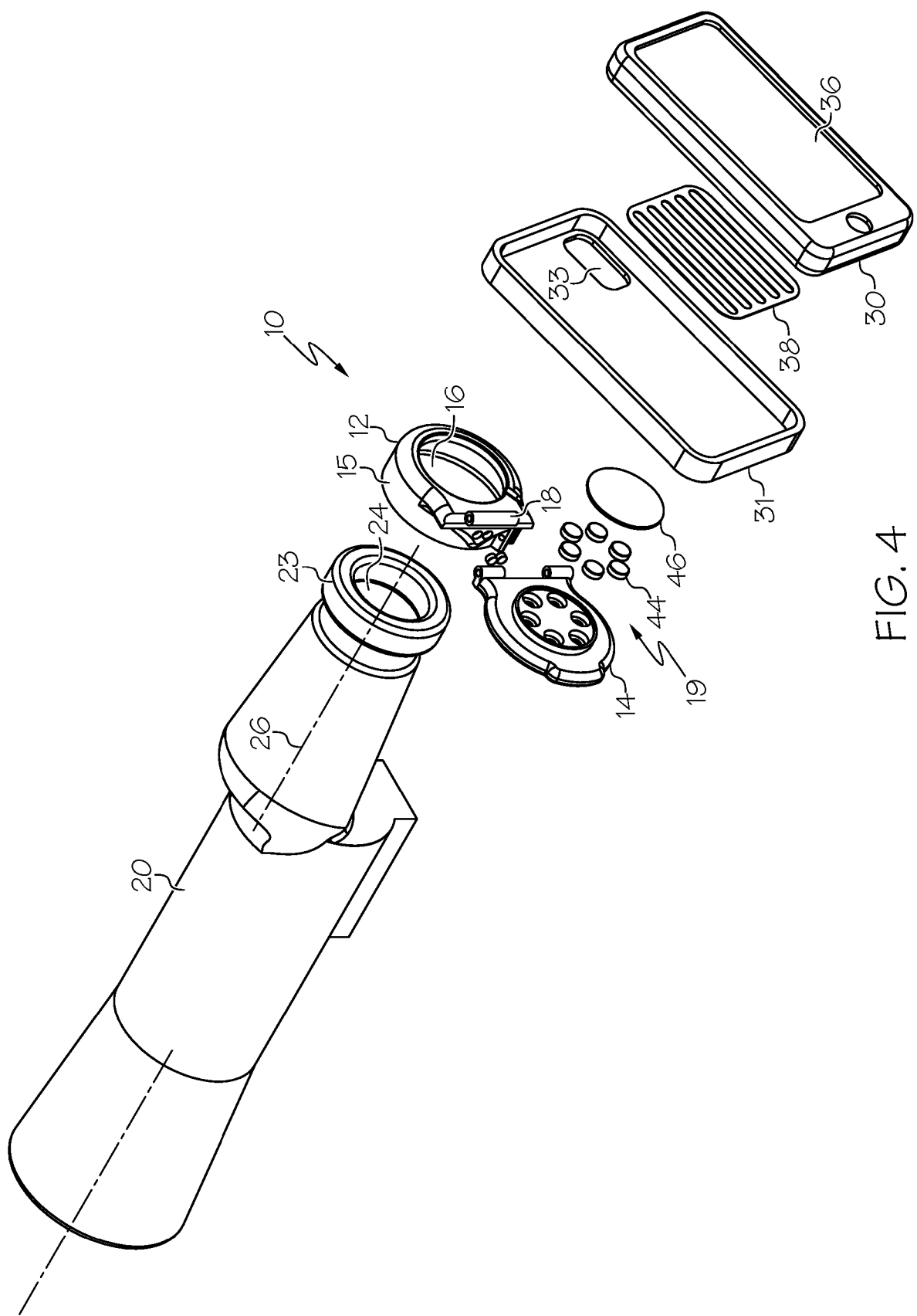
FIGS. 4 and 5 show an exploded views of an embodiment of a mount.
Figure 5:
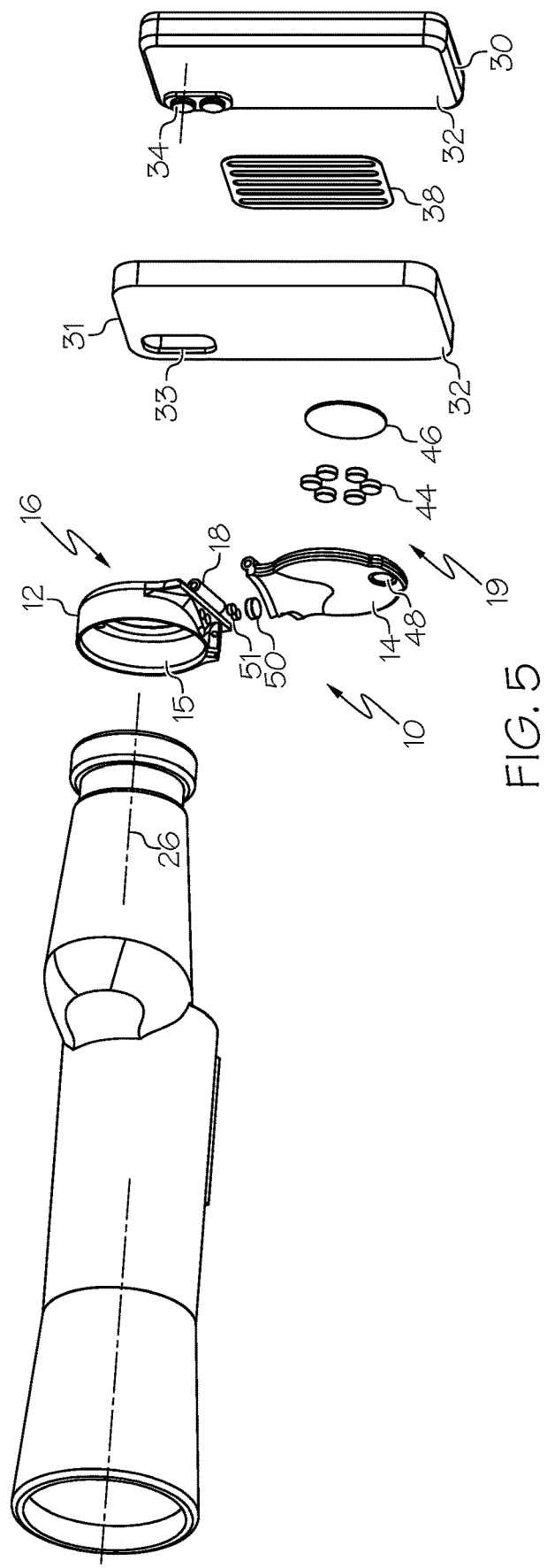

FIGS. 4 and 5 show exploded views of embodiments of items shown in FIG. 1. In some embodiments, the mount 10 comprises an engagement system 19 arranged to engage an accessory 30. In some embodiments, an engagement system 19 comprises a magnet 44 arranged to attract the accessory 30. In some embodiments, an engagement system 19 further comprises a target 38 arranged to magnetically engage the magnet 44. In some embodiments, the target 38 comprises a magnetically attractive material, such as a ferrous material. In some embodiments, the accessory 30 comprises the target 38, and the mount 10 is magnetically attracted to the target 38.

In some embodiments, the accessory 30 comprises a camera or another suitable device capable of capturing images, audio and/or video. In some embodiments, the accessory 30 comprises a smartphone comprising a touchscreen. In some embodiments, the accessory 30 comprises a lens 34. In some embodiments, the lens 34 extends from a surface 32 (e.g. a back surface) of the accessory 30. In some embodiments, the target 38 is positioned near the surface 32 adjacent to the lens 34. In some embodiments, the target 38 is attached to the surface 32. In some embodiments, the accessory 30 comprises a case 31. In some embodiments, a case 31 surrounds at least a portion of the accessory 30. In some embodiments, a case 31 comprises an aperture 33 and the lens 34 extends through the aperture 33 or is positioned to view through the aperture 33. In some embodiments, a target 38 is hidden within the case 31.

In some embodiments, the first portion 12 of the mount 10 comprises an aperture 16 and the second portion 14 comprises an engagement system 19 such as a magnet 44. In some embodiments, the aperture 16 is located adjacent to the magnet 44. In some embodiments, the accessory 30 comprises a target 38 adjacent to a lens 34. In some embodiments, the mount 10 is arranged to engage the accessory 30 with the lens 34 aligned with the aperture 16.

In some embodiments, the optical scope 20 defines an axis 26 that comprises a viewing axis. In some embodiments, the ocular lens 24 is oriented upon the axis 26. In some embodiments, the mount 10 engages the optical scope 20 with a central axis of the aperture 16 aligned upon the axis 26. In some embodiments, the mount 10 engages the accessory 30 with a central axis of the lens 34 aligned upon the axis 26. Thus, the mount 10 can engage an accessory 30, such as a smartphone, and hold the accessory 30 in place with a camera lens 34 arranged to look through the optical scope 20. The accessory 30 can then be used to capture images and video of faraway objects.

In some embodiments, an object of the mount 10 is to provide a fast and easy way to properly orient and attach the accessory 30 to the optical scope 20. In some embodiments, an object of the mount 10 is to allow a user to capture images/video through the optical scope 20 with equipment the user ordinarily carries (e.g. phone) while not requiring a stand-alone camera.

In some embodiments, the engagement system 19 comprises multiple magnets 44. Any suitable number of magnets 44 can be used. In some embodiments, the magnets 44 are equally spaced about an axis. In some embodiments, the magnets are equally spaced about a central axis of the aperture 16 when the mount 10 is in the first orientation (e.g. closed, for example as shown in FIG. 3).

In some embodiments, the second portion 14 comprises a plurality of cavities. In some embodiments, each cavity houses a magnet 44.

In some embodiments, the use of multiple magnets 44 allows more flexibility in the specific location(s) of the accessory 30/target 38 with respect to the magnets 44. For example, a single magnet may tend to self-center on the target 38, whereas multiple magnets 44 can allow for additional retention orientations for the accessory 30. The use of a greater number of magnets 44 can allow for greater degrees of freedom in the specific placement of the accessory 30 with respect to the aperture 16, which can allow a given mount 10 to be used with multiple versions of accessories 30 (e.g. various smartphone models), which may have different sizes and different lens 34 locations.

In some embodiments, the second portion 14 of the mount 10 comprises an abutting surface 60 and a flange 62 raised above the abutting surface 60. In some embodiments, the abutting surface 60 is arranged to contact the first portion 12 when the mount 10 is in the first orientation. In some embodiments, the flange 62 extends into the aperture 16 when the mount 10 is in the first orientation. In some embodiments, the flange 62 is sized to frictionally engage a surface of the first portion 12 that defines the aperture 16.

In some embodiments, one or more magnets 44 are oriented in the flange 62. In some embodiments, the mount 10 comprises a cover 46 positioned over the magnet(s) 44. In some embodiments, a cover 46 comprises a polymeric material. In some embodiments, a cover 46 comprises an elastomeric material. In some embodiments, a cover 46 comprises a bumper arranged to quiet audible noise that might be generated as the mount 10 engages an accessory 30.

In some embodiments, an accessory 30 comprises a surface 32 that defines a plane. In some embodiments, a case 31 comprises the surface 32. In some embodiments, the mount 10 comprises one or more portions aligned on a reference plane and arranged to abut the surface 32 of the accessory 30. In some embodiments, the second portion 14 comprises a contacting surface 64 arranged to contact the accessory 30. In some embodiments, the flange 62 comprises the contacting surface 64. In some embodiments, the contacting surface 64 comprises the cover 46. In some embodiments, the contacting surface 64 defines a reference plane. In some embodiments, the first portion 12 comprises an alignment surface that is also located on the reference plane. In some embodiments, a surface of the hinge 18 comprises an alignment surface. In some embodiments, a hinge knuckle 90 comprises the alignment surface. Thus, in some embodiments, an exterior surface of the hinge 18 structure is used as an orientation member for the accessory 30.

In some embodiments, a target 38 can have any suitable size, shape and configuration. In some embodiments, a target 38 comprises a solid metal plate. In some embodiments, a target 38 comprises apertures, slots or the like arranged in any suitable pattern. In some embodiments, a target 38 comprises a mesh material. In some embodiments, a target 38 comprises a grate. In some embodiments, a target 38 comprises ferric material suspended in another material, such as a cured mixture of iron powder and epoxy. Any suitable ratio of ferric material and epoxy can be used. In some embodiments, iron powder comprises 65% to 75% of a mixture by weight, with the remainder comprising a curable epoxy. In some embodiments, a curable epoxy comprises 105 Epoxy Resin and 206 Slow Hardener available from West System, 100 Patterson Ave., Bay City, MI. In some embodiments, a target 38 is capable of magnetically engaging a mount 10 and supporting an attached accessory 30. In some embodiments, an accessory 30 is capable of wireless charging and wireless charging can occur through the target 38.

In some embodiments, a mount 10 comprises a sidewall 15 arranged to contact and engage an optical scope 20. In some embodiments, a first portion 12 of the mount 10 comprises a sidewall 15. In some embodiments, the sidewall 15 is arranged to contact and engage an eye cup 23 of an optical scope 20. In some embodiments, the sidewall 15 surrounds the eye cup 23. In some embodiments, a sidewall 15 comprises a fixed size and configuration. In some embodiments, a sidewall 15 is arranged to frictionally engage an optical scope 20.

Figure 6:
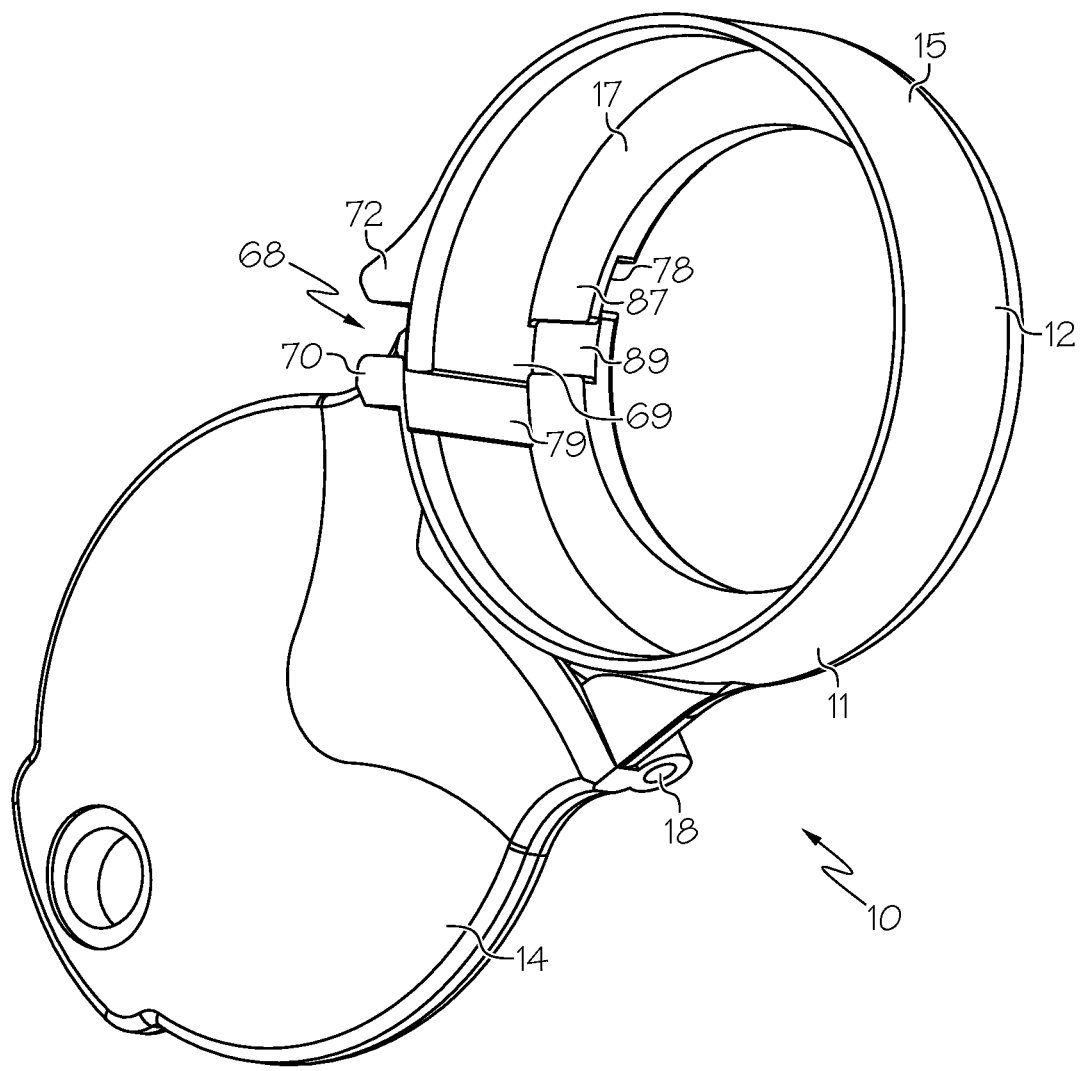
FIGS. 6-8 show an embodiment of an adjustable size mount.
Figure 7:
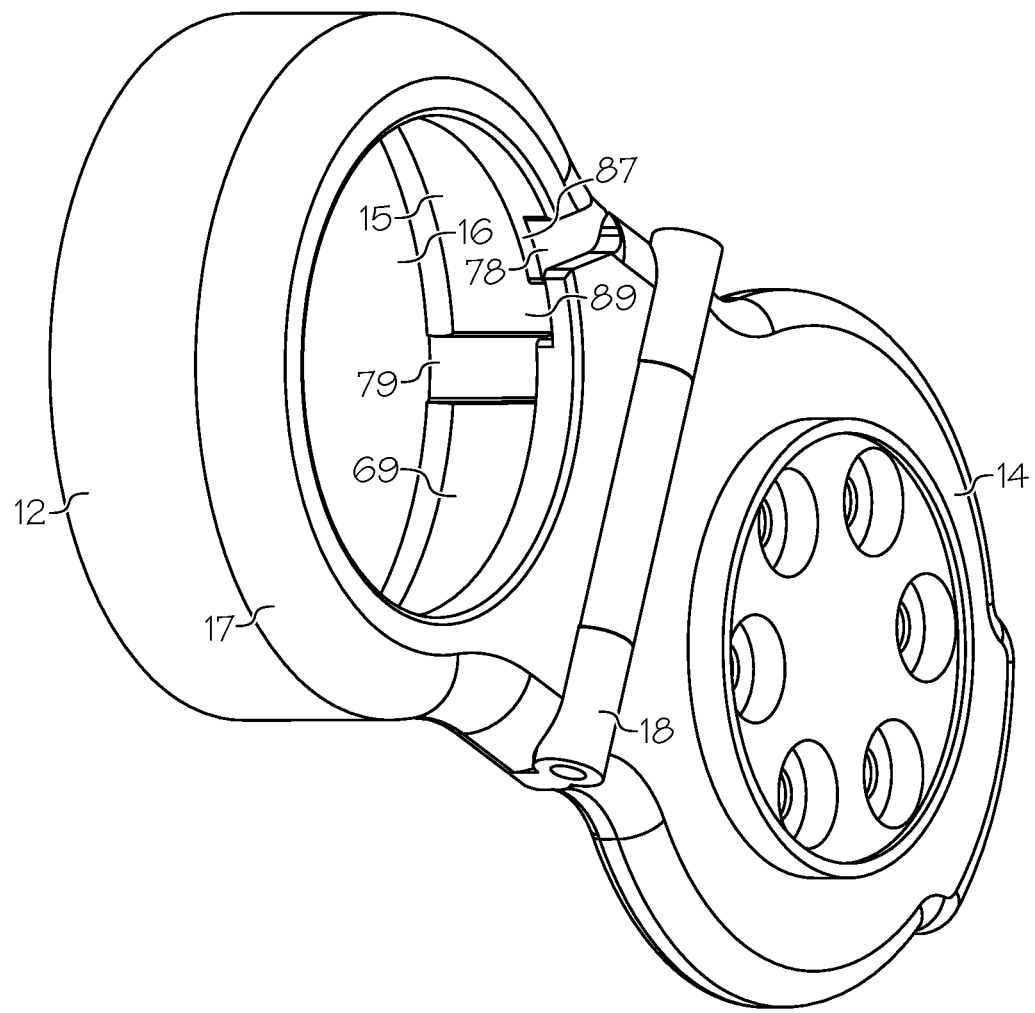
Figure 8:
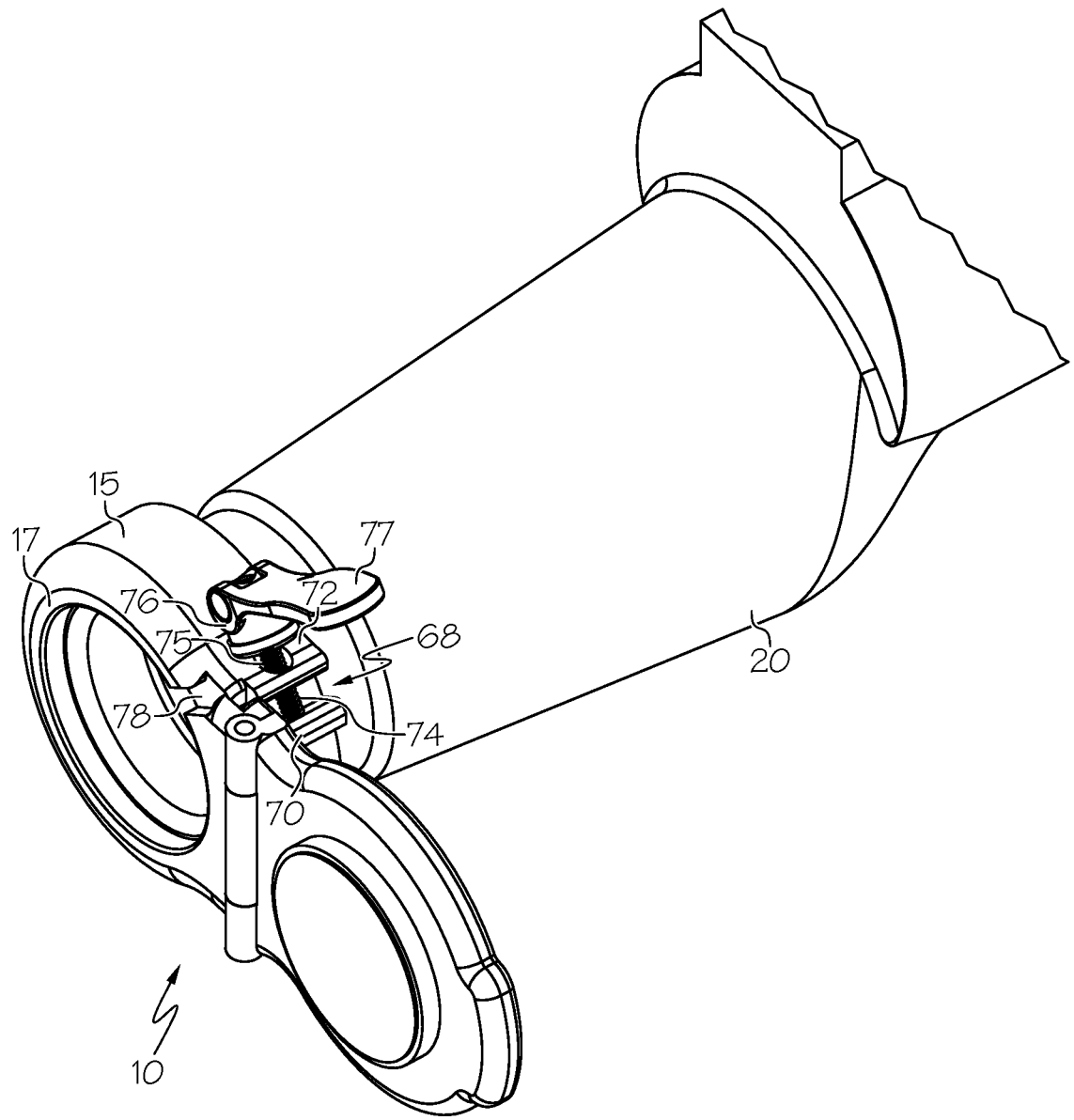

Referring to FIGS. 6-8, an embodiment of a mount 10 is shown. In some embodiments, a size of the mount 10 is adjustable. In some embodiments, a size of the sidewall 15 is adjustable. In some embodiments, the sidewall 15 comprises a circular shape and a diameter of the circular shape is adjustable. In some embodiments, the sidewall 15 defines a gap 68. In some embodiments, a size of the gap 68 can be adjusted to adjust the size of the sidewall 15. In some embodiments, the first portion 12 comprises a clamp and the size of the gap 68 is adjustable.

In some embodiments, a mount 10 comprises a first boss 70 and a second boss 72. In some embodiments, the first boss 70 and second boss 72 are located on opposite sides of the gap 68. In some embodiments, the first boss 70 and the second boss 72 define the gap 68. In some embodiments, the sidewall 15 comprises the first boss 70 and the second boss 72.

In some embodiments, a fastener 74 is arranged to adjust a size of the gap 68. In some embodiments, the fastener 74 is engaged with the first boss 70 and the second boss 72. In some embodiments, the fastener 74 is arranged to threadably engage the first boss 70. In some embodiments, the fastener 74 is arranged to abut the second boss 72. In some embodiments, the second boss 72 comprises an aperture and the fastener 74 extends through the aperture. Thus, in some embodiments, adjusting the fastener 74 will change the size of the gap 68.

In some embodiments, a mount 10 comprises a cam lock 76. In some embodiments, a cam lock 76 comprises a handle 77. In some embodiments, the handle 77 can be moved to actuate the cam lock 76. In some embodiments, the cam lock 76 comprises a quick release mechanism that can adjust a size of the gap 68. In some embodiments, a fastener 74 comprises a cam lock 76. In some embodiments, a fastener 74 comprises the handle 77.

In some embodiments, the mount 10 comprises a cover 69 arranged to cover the gap 68. In some embodiments, a cover 69 prevents dust from entering an interior portion of the mount 10. In some embodiments, the sidewall 15 comprises the cover 69. In some embodiments, the sidewall 15 comprises a recess 79. In some embodiments, a varying amount of the cover 69 is oriented in the recess 79 as a size of the gap 68 is adjusted.

In some embodiments, the mount 10 comprises a front wall 17. In some embodiments, the front wall 17 is oriented generally perpendicular to the sidewall 15. In some embodiments, the front wall 17 extends inwardly from the sidewall 15. In some embodiments, the front wall 17 defines the aperture 16.

In some embodiments, the front wall 17 comprises a gap 78. In some embodiments, a gap 68 in the sidewall 15 comprises a first gap 68 and the gap 78 in the front wall 17 comprises a second gap 78. In some embodiments, the second gap 78 is offset from the first gap 68. For example, in some embodiments, the first gap 68 and the second gap 78 are located along different radial vectors extending from a central axis of the aperture 16.

In some embodiments, the mount 10 comprises a cover 87 arranged to cover the gap 78. In some embodiments, a cover 87 prevents dust from entering an interior portion of the mount 10. In some embodiments, the front wall 17 comprises the cover 87. In some embodiments, the front wall 17 comprises a recess 89. In some embodiments, a varying amount of the cover 87 is oriented in the recess 89 as a size of the gap 78 is adjusted. In some embodiments, the cover 87 comprises a second cover and the recess 89 comprises a second recess.

In some embodiments, the sidewall 15 and front wall 17 are fixedly attached or integral to one another. In some embodiments, the sidewall 15 and the wall 17 are defined by a single piece of material. In some embodiments, adjustment of a size of the first gap 68 will cause a change in the size of the second gap 78.

Figure 9:
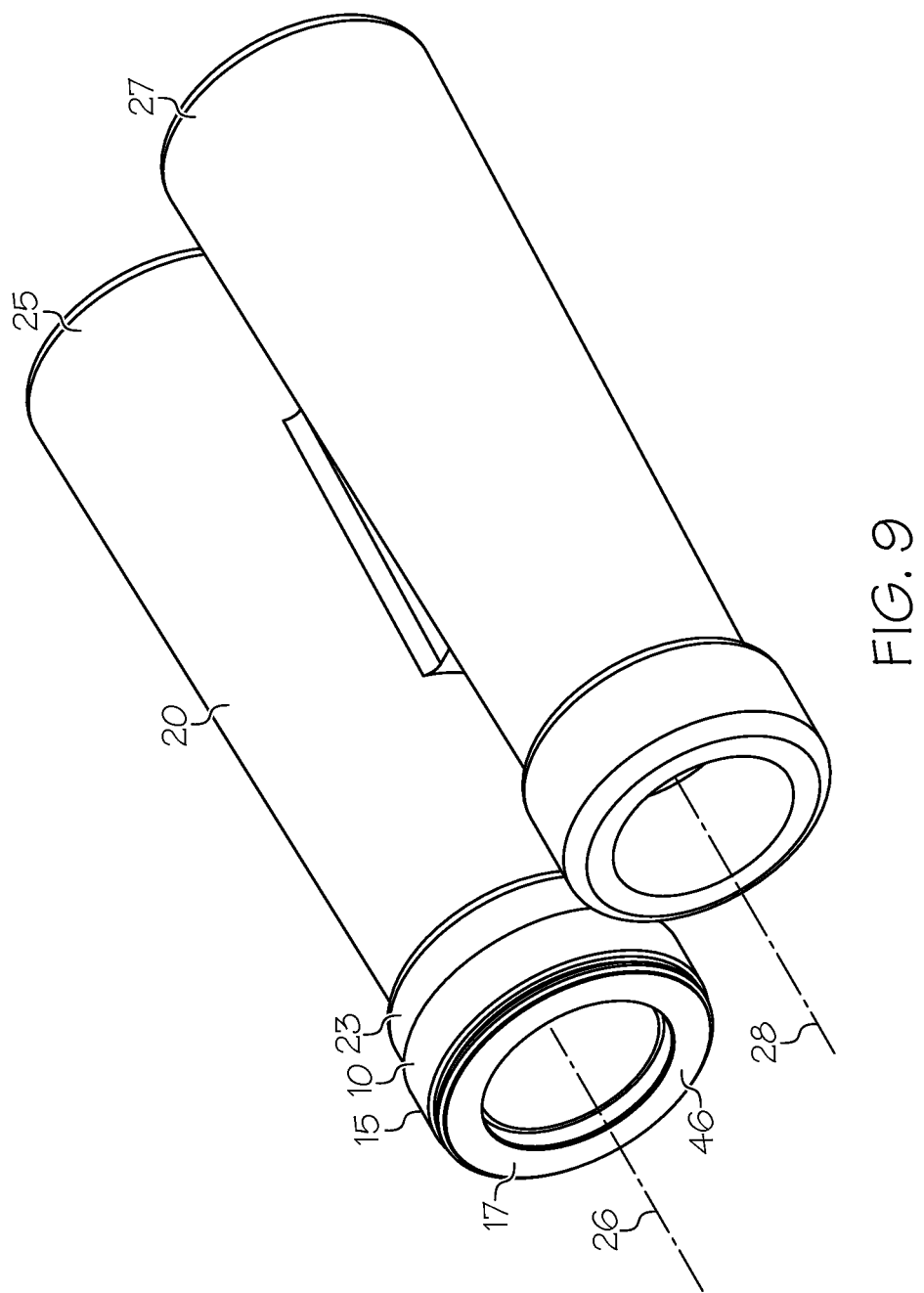
FIG. 9 shows another embodiment of a mount and optical scope.
Figure 10:
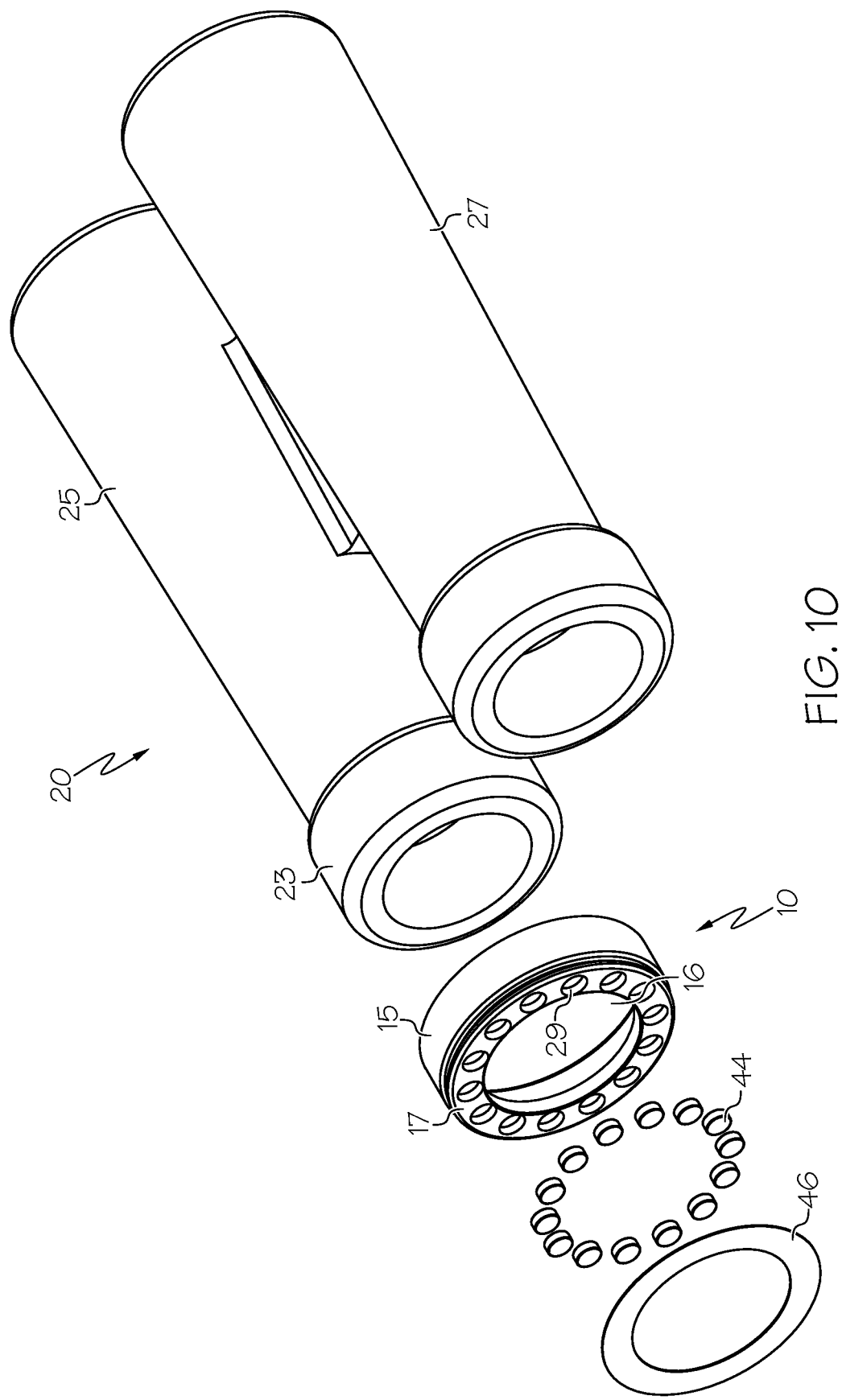
FIG. 10 shows an exploded view of the mount of FIG. 9.
Figure 11:
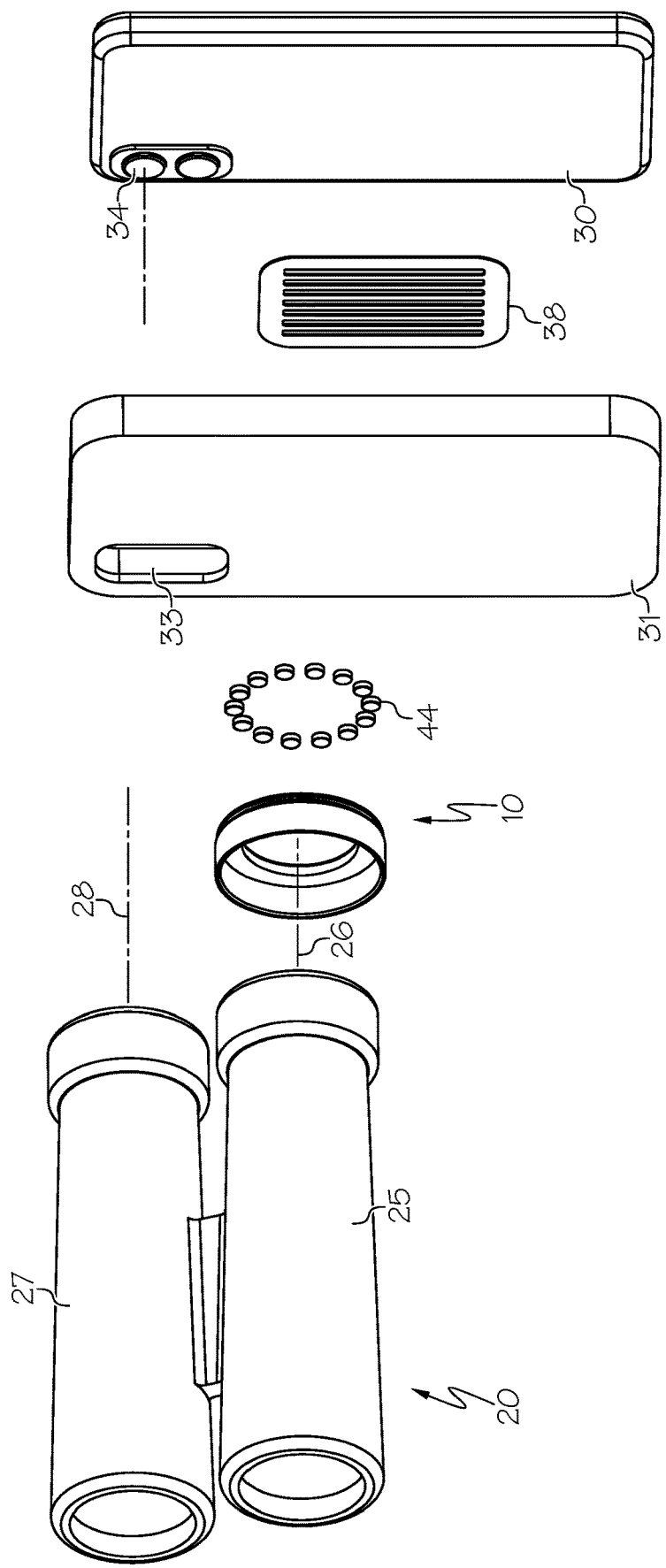
FIG. 11 shows an exploded view of the optical scope of FIGS. 9 and 10 with an accessory.

FIGS. 9-11 show another embodiment of a mount 10. In some embodiments, a mount 10 is suitable for use with an optical scope 20 comprising a first scope 25 and a second scope 27, such as a binocular. In some embodiments, the first scope 25 is arranged on a first axis 26 and the second scope 27 is arranged on a second axis 28.

In some embodiments, a mount 10 comprises a sidewall 15 and a front wall 17. In some embodiments, the mount 10 comprises a plurality of magnets 44. In some embodiments, magnets 44 are contained in the front wall 17. In some embodiments, the front wall 17 comprises a plurality of cavities 29 and each cavity 29 contains a magnet 44. In some embodiments, the mount 10 comprises an aperture 16 and the magnets 44 are equally spaced about the aperture 16.

In some embodiments, an accessory 30 can be engaged with the mount 10, wherein the mount 10 positions the accessory 30 with respect to the optical scope 20. In some embodiments, the mount 10 magnetically attracts a target plate 38 that is attached to the accessory 30. In some embodiments, the accessory 30 comprises a lens 34, and the target plate 38 is offset from the lens 34. In some embodiments, the accessory 30 is engaged with a mount 10 in proximity to a first scope 25 and a lens 34 of the accessory 30 is aligned with the second scope 27. In some embodiments, the lens 34 is aligned upon an axis 28 of the second scope 27. In some embodiments, an accessory 30 is engaged with a first scope 25 of a binocular and a lens 34 of the accessory 30 is arranged to view through a second scope 27 of the binocular.

Figure 12:
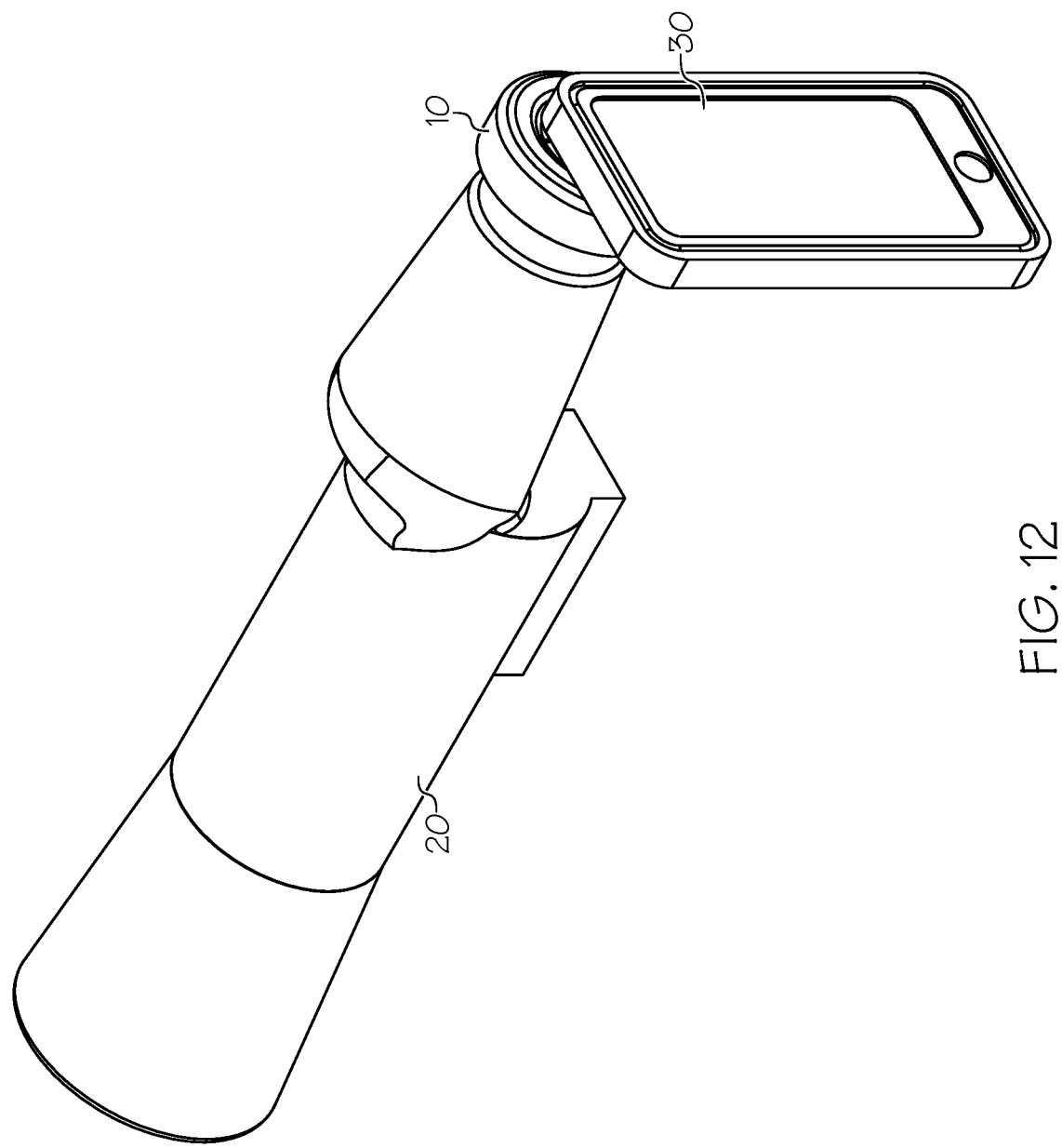
FIG. 12 shows another embodiment of an optical scope, mount and accessory.
Figure 13:
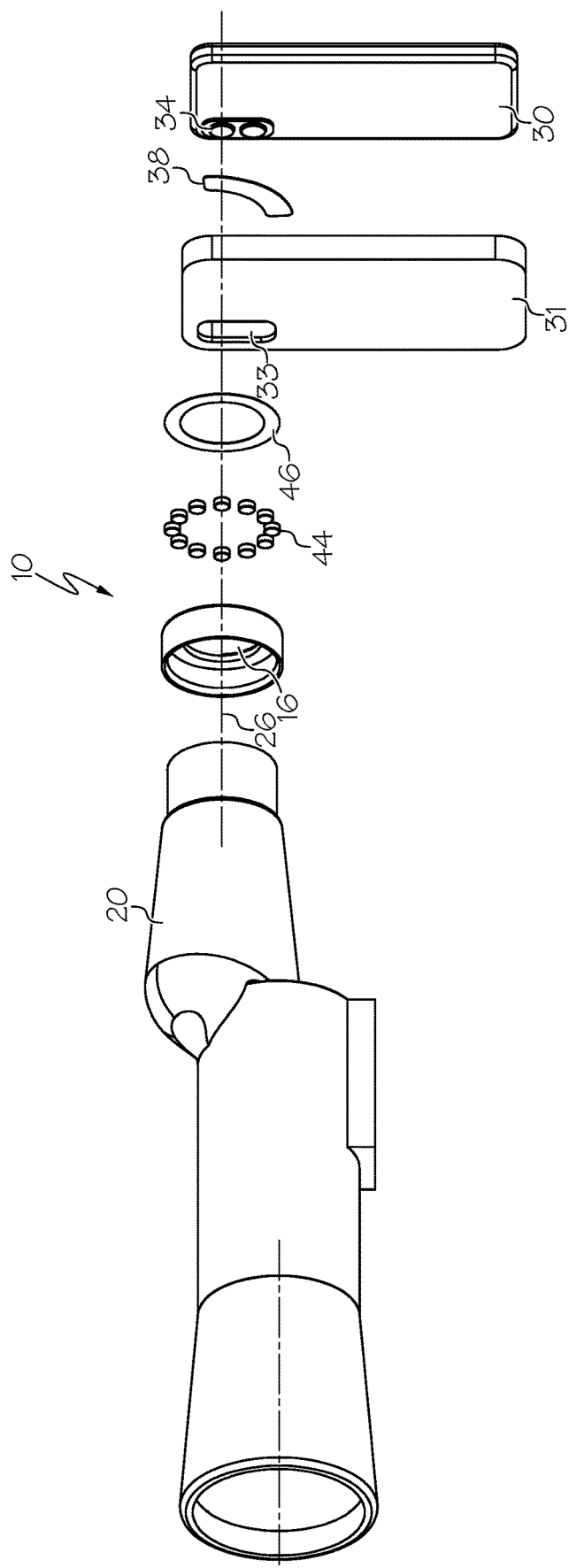
FIG. 13 shows an exploded view of the components shown in FIG. 12.

FIGS. 12 and 13 show another embodiment of a mount 10 and target plate 38. In some embodiments, a mount 10 comprises a plurality of magnets 44 disposed about an aperture 16. The aperture 16 can be aligned upon an axis 26 of an optical scope 20. In some embodiments, a target plate 38 is magnetically attracted to the mount 10. In some embodiments, the target plate 38 comprises a curved body. In some embodiments, the target plate 38 comprises an arcuate shape. In some embodiments, the target plate 38 comprises a semicircular shape. In some embodiments, the target plate 38 comprises a circular arc. In some embodiments, the target plate 38 extends around a lens 34 of the accessory 30. In some embodiments, the target plate 38 is concave with respect to the lens 34.

Figure 14:
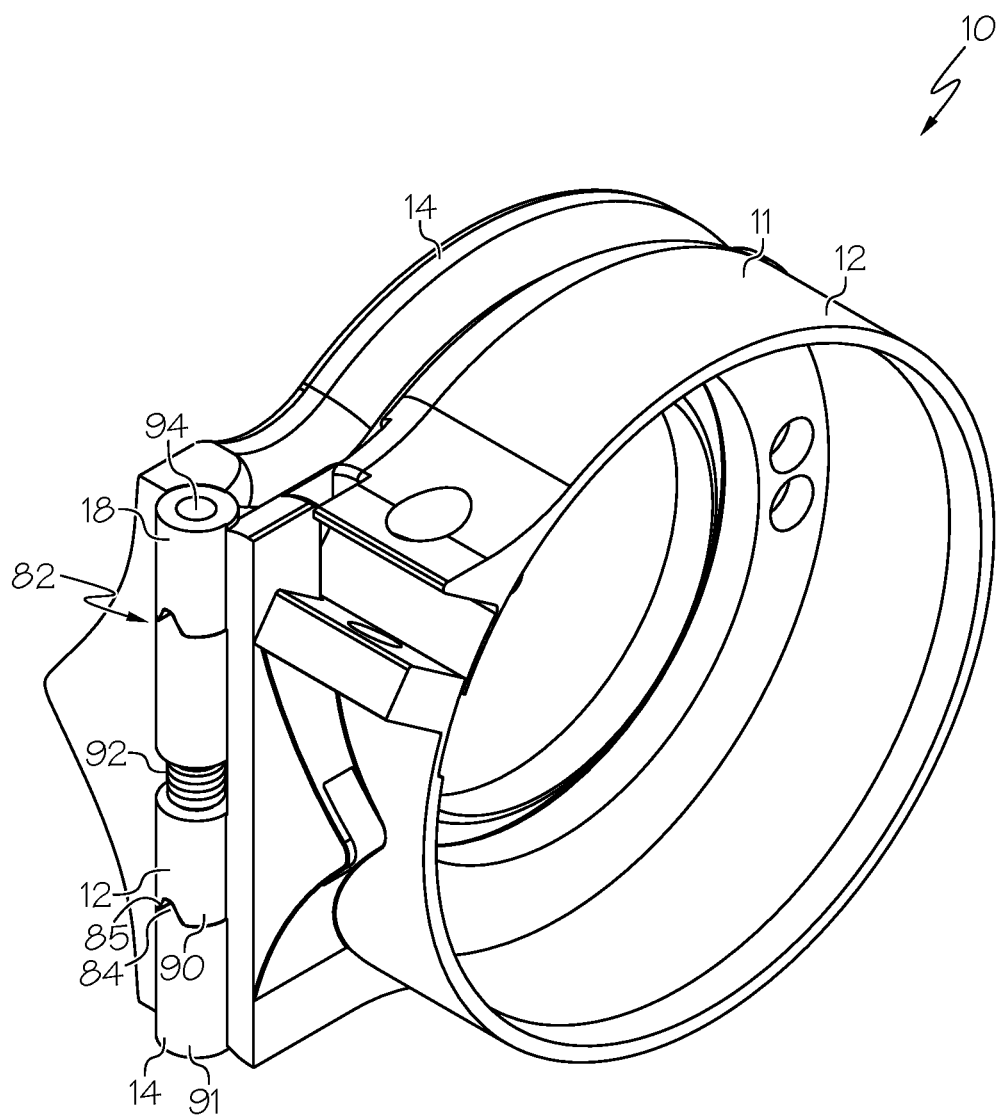
FIGS. 14 and 15 show another embodiment of a mount.
Figure 15:
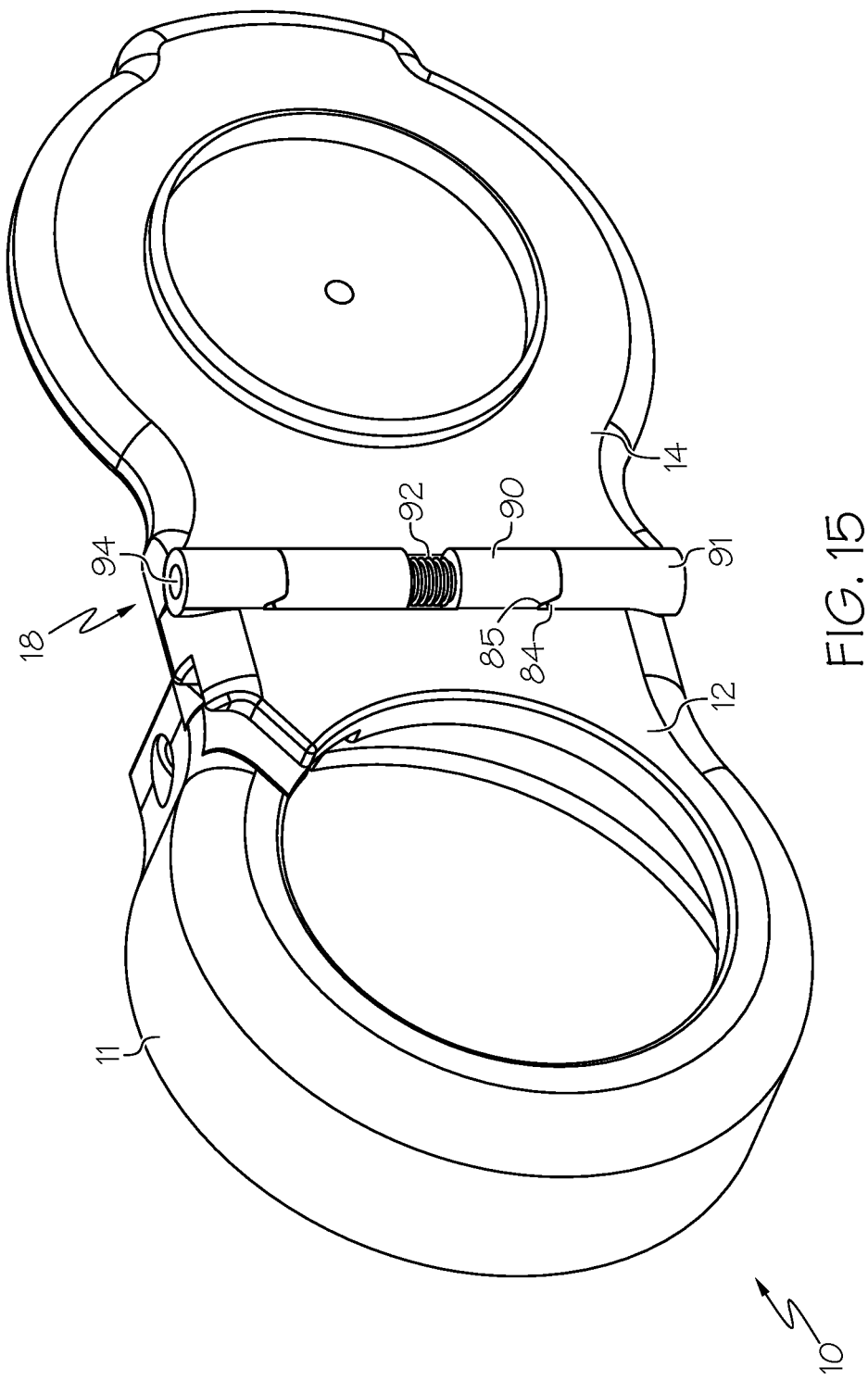
Figure 16:
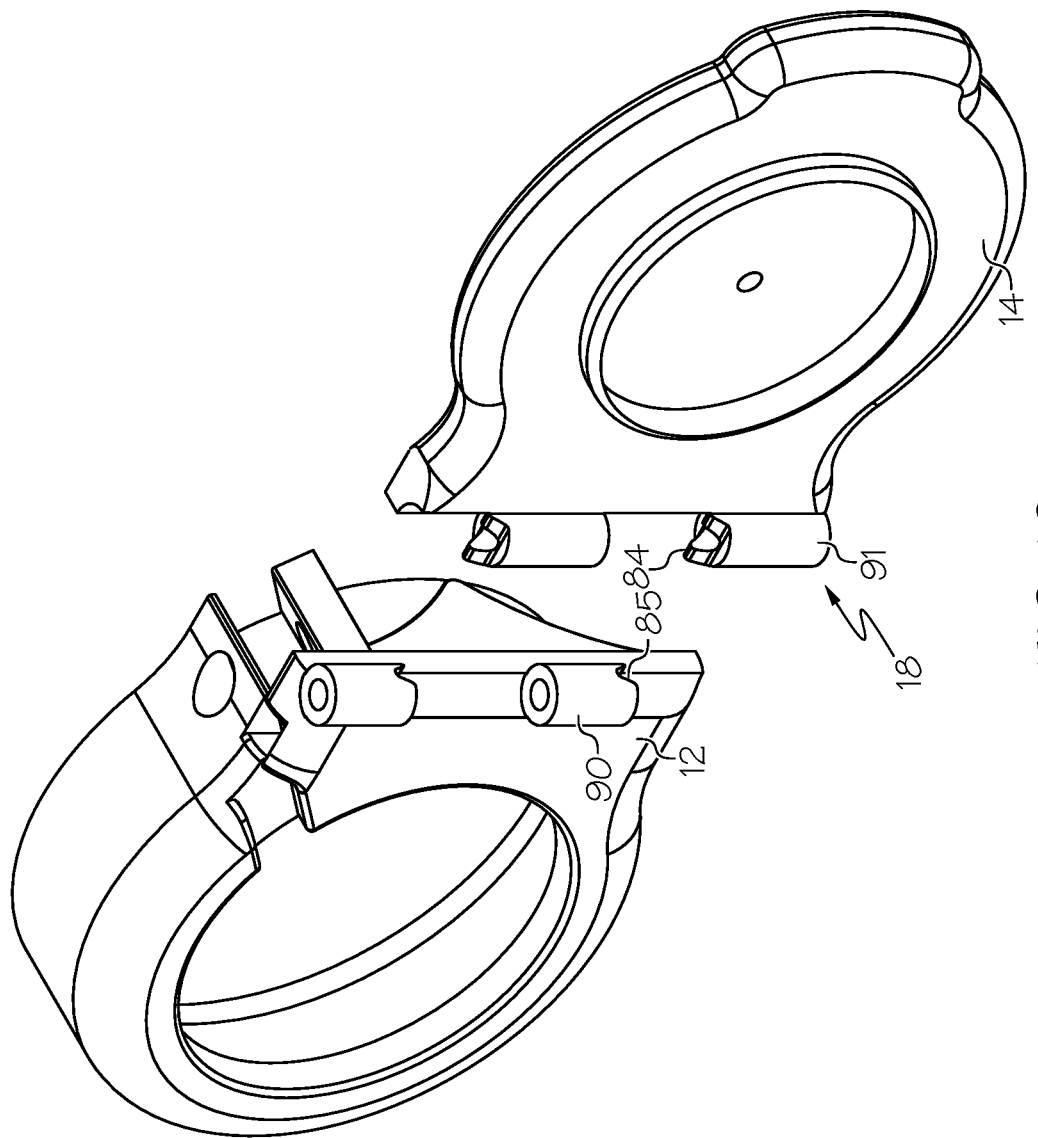
FIG. 16 shows an exploded view of the mount shown in FIGS. 14 and 15.

FIGS. 14-16 show another embodiment of a mount 10. In some embodiments, a mount 10 comprises a body 11 comprising a first portion 12 and a second portion 14 moveable with respect to the first portion 12. In some embodiments, the mount 10 comprises a detent 82 arranged to bias the first portion 12 and second portion 14 to a predetermined orientation with respect to one another. In some embodiments, a detent 82, or a plurality of detents 82, are arranged to bias the second portion 14 to one or more predetermined orientations with respect to the first portion 12.

In some embodiments, a detent 82 comprises an interface between the first portion 12 and the second portion 14. In some embodiments, a detent 82 comprises a peak 84 arranged to be received in a valley 85. In some embodiments, a peak 84 comprises a protrusion and a valley 85 comprises a recess. In some embodiments, the second portion 14 comprises a peak 84 and the first portion 12 comprises a valley 85, or vice versa.

In some embodiments, the mount 10 comprises a biasing member 92 arranged to engage the detent 82. In some embodiments, a biasing member 92 is arranged to cause a peak 84 to engage with a valley 85. In some embodiments, a biasing member 92 causes a peak 84 to align upon and seat in a valley 85. In some embodiments, a biasing member 92 applies forces between the first portion 12 and the second portion 14. In some embodiments, a biasing member 92 comprises a spring. In some embodiments, a biasing member 92 comprises a coil spring.

In some embodiments, a hinge 18 comprises a pin 94 arranged to contact the first portion 12 and the second portion 14. In some embodiments, a biasing member 92 is arranged to surround the pin 94.

In some embodiments, a hinge 18 comprises a detent 82. In some embodiments, a hinge 18 comprises a knuckle 90, 91 and the knuckle 90, 91 comprises a detent 82. In some embodiments, the first portion 12 comprises a first knuckle 90 and the second portion 14 comprises a second knuckle 91. In some embodiments, a pin 94 engages the first knuckle 90 and the second knuckle 91. In some embodiments, the first knuckle 90 and the second knuckle 91 engage one another via a detent 82. In some embodiments, the first knuckle 90 comprises a valley 85 and the second knuckle 91 comprises a peak 84 arranged to nest in the valley 85. In some embodiments, a biasing member 92 applies forces to the first portion 12 and second portion 14 that encourage the peak 84 to nest in the valley 85. In some embodiments, moving the first portion 12 with respect to the second portion 14, for example via rotation about the hinge 18, causes a detent 82 to disengage. In some embodiments, moving the first portion 12 with respect to the second portion 14 causes a peak 84 to unseat from a valley 85. In some embodiments, the first portion 12 will move along an axis of the hinge 18 with respect to the second portion 14 as a detent 82 disengages. In some embodiments, disengagement of a detent 82 applies forces to the biasing member 92, for example compressing the biasing member 92.

In some embodiments, a first knuckle 90 comprises a plurality of detent 82 locations. In some embodiments, a second knuckle 91 comprises a plurality of complimentary detent 82 locations. In some embodiments, the detent locations and complimentary detent locations are equally spaced about a periphery of the knuckle 90, 91. In some embodiments, a first knuckle 90 comprises a plurality of valleys 85. In some embodiments, the valleys 85 are equally spaced around a central axis of the hinge 18. In some embodiments, the second knuckle 91 comprises a plurality of peaks 84. In some embodiments, the peaks 84 are equally spaced around a central axis of the hinge 18. In some embodiments, the number of peaks 84 is equal to the number of valleys 85. In some embodiments, the number of peaks 84 and valleys 85 is equal to the number of different orientations that the first portion 12 can be biased to with respect to the second portion 14. In some embodiments, the number of peaks 84 represents the number of detent stop positions available when the peaks 84 are seated in the various valleys 85.

In some embodiments, a mount 10 comprises both detents 82 and magnets 48, 50 as described herein.

In some embodiments, the concept of the mount 10 can be integrated into an optical scope 20. In some embodiments, an eye cup 23 of a scope 20 comprises features of a mount 10 as described herein, for example comprising a plurality of magnets 44 oriented around an aperture 16. In some embodiments, an eye cup 23 of a scope 20 comprises a first portion 12 and a second portion 14 as described herein.

Figure 17:
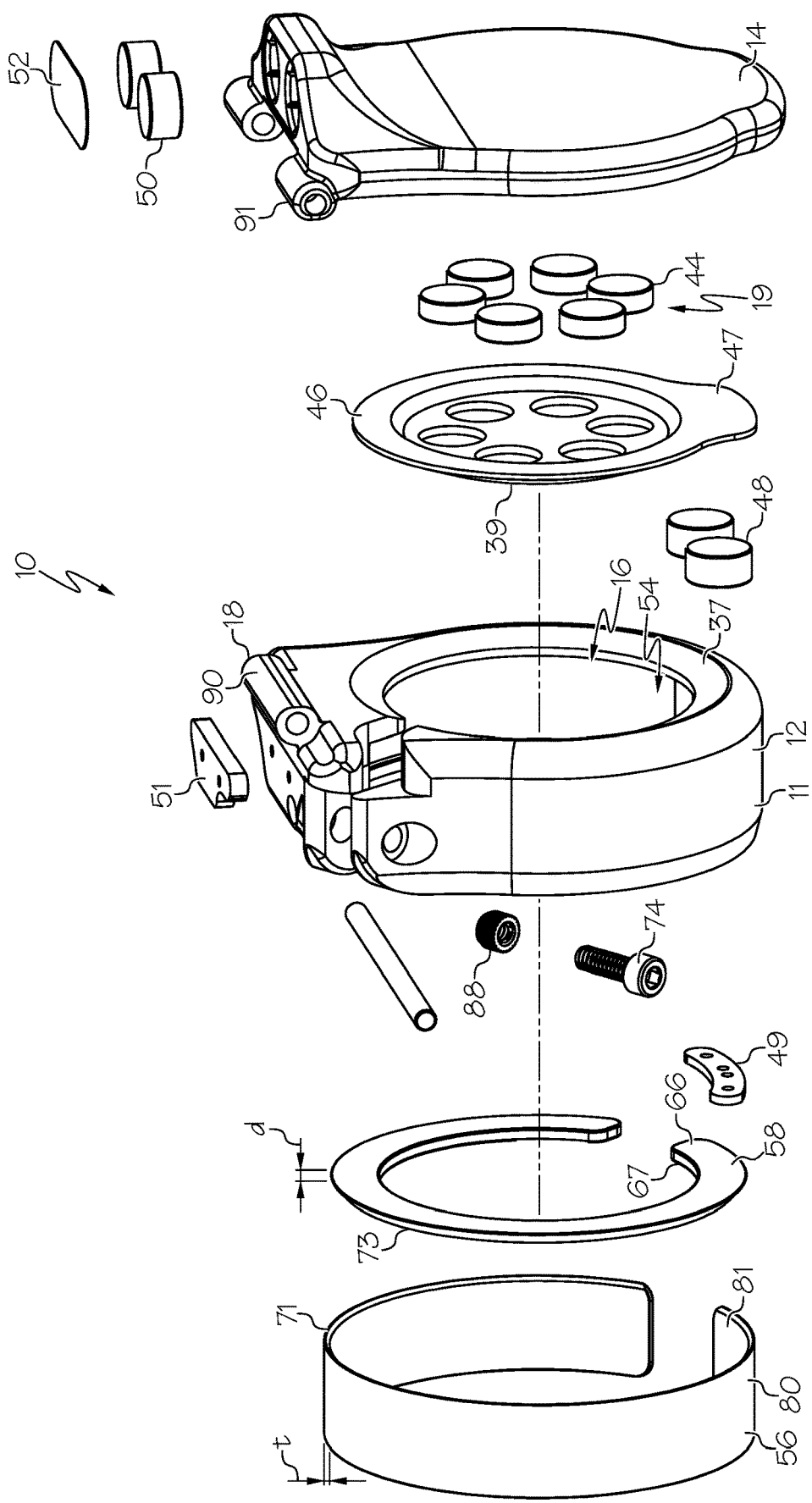
FIG. 17 shows an exploded view of another embodiment of a mount.

FIG. 17 shows an embodiment of a mount 10. FIG. 18 shows a cross-sectional view of the embodiment of a mount 10 shown in FIG. 17.

In some embodiments, a mount 10 comprises a sizing adapter 56. In some embodiments, a sizing adapter 56 can be positioned between the body 11 and an optical scope. For example, when using an optical scope having a relatively smaller diameter eye cup, a sizing adapter 56 can be oriented between the eye cup and the mount 10. In some embodiments, a sizing adapter 56 can be used to change an inner diameter of the first portion 12.

In some embodiments, a mount 10 comprises a focus adapter 58. In some embodiments, a focus adapter 58 can be positioned between the body 11 and an optical scope, for example to adjust a distance between the aperture 16 and the ocular lens of an optical scope.

In some embodiments, the mount 10 comprises a cavity 54. In some embodiments, the first portion 12 comprises the cavity 54. In some embodiments, the cavity 54 is defined by the sidewall 15. In some embodiments, the sidewall 15 comprises a flange 55 oriented opposite the front wall 17, and the cavity 54 is defined by the front wall 17 and flange 55. In some embodiments, the cavity 54 is annular and surrounds the aperture 16.

In some embodiments, a sizing adapter 56 can be used in the cavity 54 without a focus adapter 58. In some embodiments, a focus adapter 58 can be used in the cavity without a sizing adapter 56. In some embodiments, both a sizing adapter 56 and a focus adapter 58 can be used in the cavity 54 simultaneously.

In some embodiments, a sizing adapter 56 comprises a first surface 80 arranged to contact the first portion 12 and a second surface 81 arranged to contact an optical scope. In some embodiments, the first surface 80 comprises an outer surface and the second surface 81 comprises an inner surface. In some embodiments, a sizing adapter 56 comprises a circular shape. In some embodiments, a sizing adapter 56 surrounds the aperture 16.

In some embodiments, multiple sizing adapters 56 can be provided having different thicknesses t, allowing different sizing adapters 56 to be used with different optical scopes.

In some embodiments, a focus adapter 58 comprises a first surface 66 arranged to contact the first portion 12 and a second surface 67 arranged to contact an optical scope. In some embodiments, the first surface 66 contacts the front wall 17. In some embodiments, multiple focus adapters 58 can be provided having different depths d, allowing different focus adapters 58 to be used with different optical scopes and/or different accessories, smartphones, cameras, etc.

In some embodiments, a sizing adapter 56 comprises a bevel 71. In some embodiments, a focus adapter 58 comprises a complimentary bevel 73. In some embodiments, the bevel 71 of a sizing adapter 56 contacts the complimentary bevel 73 of a focus adapter 58. In some embodiments, the bevels 71, 73 prevent overlap and/or interference between a sizing adapter 56 and a focus adapter 58 oriented in the cavity 54. Thus, the bevels 71, 73 allow multiple sizing adapters 56 and multiple focus adapters 58 to be used interchangeably in the cavity 54 with proper fit between the cavity 54 and the adapters 56, 58.

The sizing adapters 56 and focus adapters 58 discussed with respect to FIGS. 17 and 18 can be used with any suitable embodiment of a mount 10 as disclosed herein.

In some embodiments, the mount 10 comprises a cover 52 positioned over the second position magnet(s) 50. In some embodiments, a cover 52 comprises a soft material arranged to prevent noise when the second position magnet(s) 50 engage their target 51. In some embodiments, a cover 52 is polymeric. In some embodiments, a cover 52 is elastomeric.

In some embodiments, the first portion 12 comprises a front bevel 37. In some embodiments, the front wall 17 comprises the front bevel 37. In some embodiments, the front bevel 37 is annular and surrounds the aperture 16. In some embodiments, the second portion 14 comprises a complimentary bevel 39. In some embodiments, the cover 46 comprises the complimentary bevel 39. In some embodiments, the front bevel 37 and complimentary bevel 39 are arranged to contact one another and provide a dust cover for the aperture 16 when the mount 10 is in the first/closed orientation.

In some embodiments, the cover 46 comprises an extension 47 arranged to cover the first position magnet(s) 48.

In some embodiments, the mount 10 comprises an adjustment fastener 74. In some embodiments, the mount 10 comprises a threaded receptacle 88 arranged to engage the fastener 74. In some embodiments, the threaded receptacle 88 is insert molded into the first portion 12. In some embodiments, the first position magnet target 49 is insert molded into the first portion 12. In some embodiments, the second position magnet target 51 is insert molded into the first portion 12.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to." Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. An apparatus comprising:
 a body arranged to engage an optical scope, the body comprising a first portion and a second portion moveable with respect to the first portion between a first position and a second position, the first portion comprising a sidewall defining an aperture having a central axis, the second portion comprising a plurality of magnets;
 in the first position, the second portion is arranged to cover the aperture and a radial distance from the central axis to the sidewall is greater than a radial distance from the central axis to the plurality of magnets.

2. The apparatus of claim 1, in the second position, the second portion does not cover the aperture.

3. The apparatus of claim 2, the body comprising a second position magnet arranged to bias the body to the second orientation.

4. The apparatus of claim 3, wherein one of the first portion and the second portion comprise the second position magnet and the other of the first portion and the second portion comprise a magnetic target.

5. The apparatus of claim 2, the first portion comprising an alignment surface, the second portion comprising a contacting surface, wherein in the second position, the alignment surface and the contacting surface are oriented on a reference plane.

6. The apparatus of claim 5, the alignment surface comprising a hinge knuckle.

7. The apparatus of claim 2, the contacting surface comprising a non-metal.

8. The apparatus of claim 1, in the first position, the plurality of magnets are equally spaced around the central axis.

9. The apparatus of claim 1, the body comprising a hinge.

10. The apparatus of claim 9, the hinge comprising a pin.

11. The apparatus of claim 1, the first portion comprising a clamp arranged to reduce a diameter of the sidewall.

12. The apparatus of claim 1, the first portion comprising a front wall and a focus adapter configured to be positioned between the front wall and the optical scope.

13. The apparatus of claim 12, the first portion comprising a sizing adapter, the sizing adapter and the focus adapter comprising complimentary beveled surfaces arranged to contact one another.

14. The apparatus of claim 1, the first portion comprising a sizing adapter positioned between the sidewall and the optical scope.

15. The apparatus of claim 1 in combination with an accessory comprising a target and a lens, the magnet arranged to engage the target and retain the lens in alignment with the aperture.

16. An apparatus in combination with an accessory and a binocular having a first scope and a second scope, the apparatus comprising:
 a body arranged to engage the first scope, the body comprising an aperture and a plurality of magnets spaced around the aperture,
 the accessory comprising a target and a lens, the target being configured to be aligned with the first scope, the lens being configured to be aligned with the second scope.

17. The apparatus of claim 16, the magnets are equally spaced around the aperture.

18. The apparatus of claim 16, the plurality of magnets are arranged to engage the target and retain the lens in alignment with the aperture.

19. An apparatus comprising:
 a body arranged to engage an optical scope, the body comprising a first portion and a second portion moveable with respect to the first portion between a first position and a second position, the first portion comprising:
 a sidewall defining an aperture having a central axis;
 a front wall and a focus adapter configured to be positioned between the front wall and the optical scope; and a sizing adapter, wherein the sizing adapter and the focus adapter comprise complimentary beveled surfaces arranged to contact one another;

the second portion comprising a magnet;

in the first position, the second portion is arranged to cover the aperture and a radial distance from the central axis to the sidewall is greater than a radial distance from the central axis to the magnet.

\* \* \* \* \*